United States Patent [19]

Morris

[11] 4,114,354

[45] Sep. 19, 1978

[54] LAWN MOWER BLADE MOUNTING

[75] Inventor: Richard L. Morris, Galesburg, Ill.

[73] Assignee: Outboard Marine Corporation, Waukegan, Ill.

[21] Appl. No.: 739,322

[22] Filed: Nov. 5, 1976

[51] Int. Cl.² ............................................ A01D 55/18
[52] U.S. Cl. ...................................................... 56/295
[58] Field of Search ...................... 56/295, 11.3, 10.5, 56/10.2

[56] References Cited

U.S. PATENT DOCUMENTS

| 3,738,092 | 6/1973 | Spear | 56/295 |
| 3,998,034 | 12/1976 | Rubin | 56/11.3 |

FOREIGN PATENT DOCUMENTS

| 246,599 | 11/1960 | Australia | 56/295 |
| 1,582,352 | 5/1970 | Fed. Rep. of Germany | 56/295 |
| 2,058,347 | 6/1972 | Fed. Rep. of Germany | 56/295 |
| 2,327,356 | 1/1975 | Fed. Rep. of Germany | 56/295 |

Primary Examiner—Jay N. Eskovitz
Attorney, Agent, or Firm—Michael, Best & Friedrich

[57] ABSTRACT

Disclosed herein is a lawn mower comprising a blade housing, a member adapted for rotation within the blade housing and having a peripheral edge, a blade movably secured to the member for movement between a retracted position wherein the blade is positioned inwardly of the peripheral edge, and an extended position wherein the blade extends outwardly beyond the peripheral edge, and a spring for biasing the blade to the retracted position in the absence of rotation of the member above a predetermined speed.

24 Claims, 9 Drawing Figures

U.S. Patent  Sept. 19, 1978  Sheet 1 of 2  4,114,354
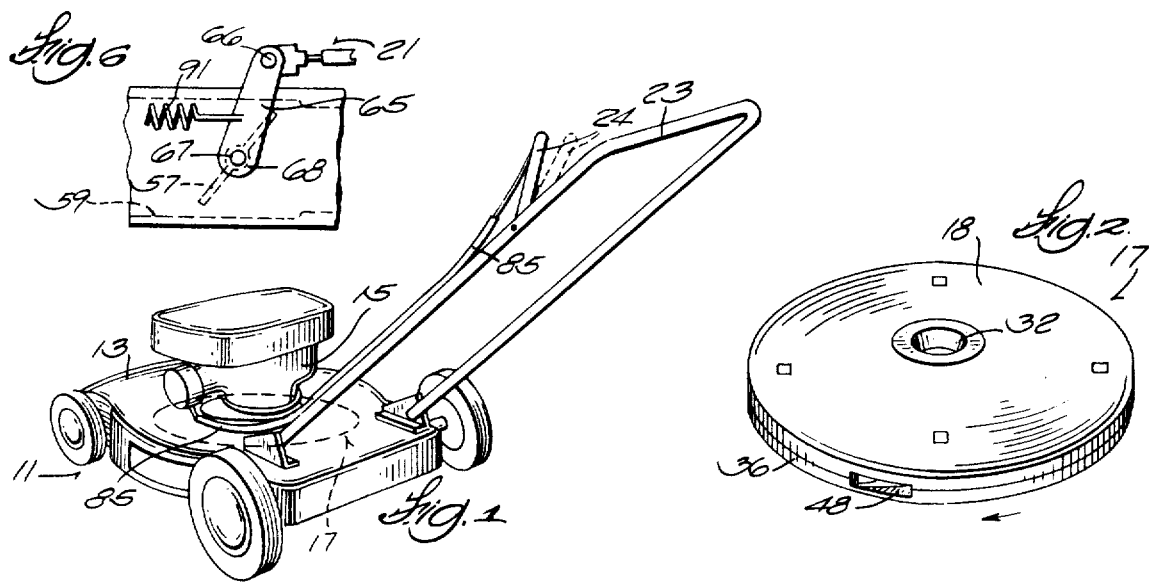
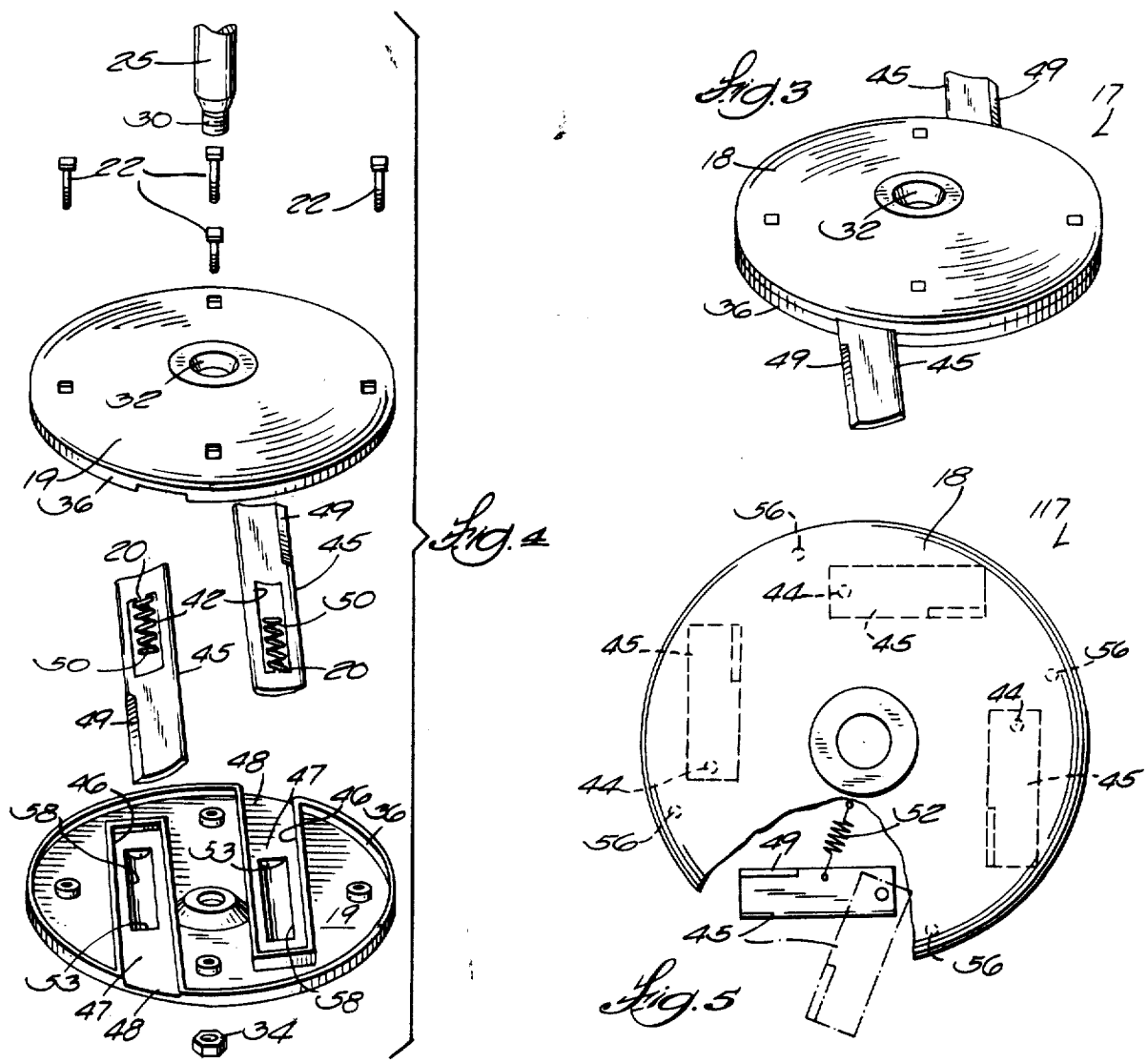

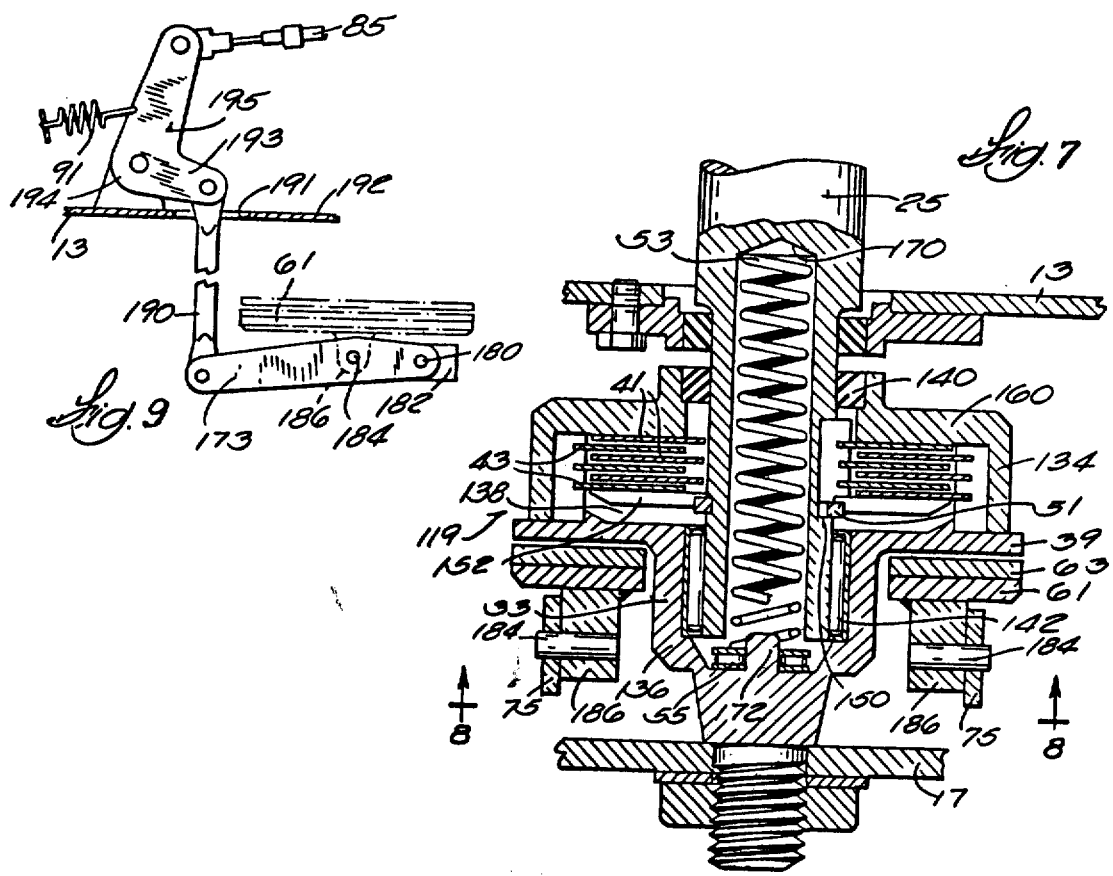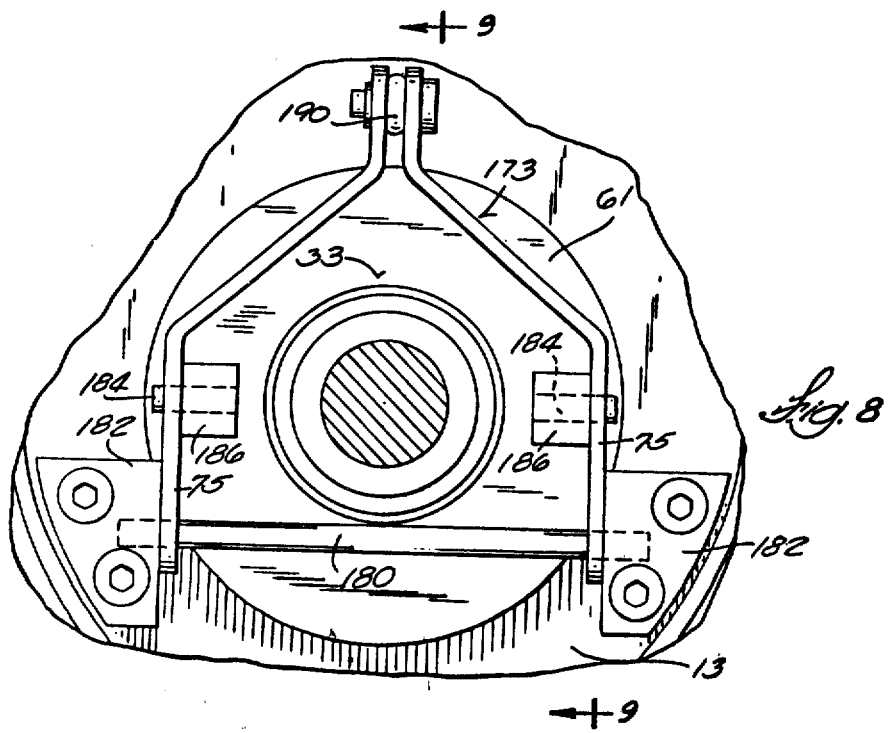

4,114,354

LAWN MOWER BLADE MOUNTING

BACKGROUND OF THE INVENTION

The invention relates generally to rotary lawn mowers, and more particularly, to rotary lawn mowers including a blade mounting secured for rotation within a blade housing. Still more particularly, the invention relates to blade mountings which include blades movably mounted for displacement between a retracted position and an extended position.

Attention is directed to the following United States Patents:

| Kontis   | 2,939,264 | issued June 7, 1960   |
|----------|-----------|------------------------|
| Harloff  | 3,184,907 | issued May 25, 1965   |
| Tatum    | 3,133,398 | issued May 19, 1964   |
| Wood     | 3,690,051 | issued Sept. 12, 1972 |
| Goserud  | 3,715,874 | issued Feb. 13, 1973  |
| Kirk     | 3,320,732 | issued May 23, 1967   |

SUMMARY OF THE INVENTION

The invention provides a lawn mower comprising a blade housing, a member adapted for rotation within the blade housing and having a peripheral edge, a blade movably secured to the member for movement between a retracted position wherein the blade is positioned inwardly of the peripheral edge, and an extended position wherein the blade extends outwardly beyond the peripheral edge, and means for biasing the blade to the retracted position in the absence of rotation of the member above a predetermined speed.

The invention also provides a blade mounting adapted for use with a lawn mower having a blade housing, the mounting comprising a member adapted for rotation within the blade housing and having a peripheral edge, a blade movably secured to the member for movement between a retracted position wherein the blade is positioned inwardly of the peripheral edge, and an extended position wherein the blade extends outwardly beyond the peripheral edge, and means for biasing the blade to the retracted position in the absence of rotation of the member above a predetermined speed.

In accordance with an embodiment of the invention, the lawn mower includes a handle having an operating lever movably mounted on the handle for displacement by an operator between a first position spaced from the handle and a second position adjacent the handle, and control means including means for biasing the lever to the first position, the control means automatically reducing the speed of rotation of the member below the predetermined speed in the absence of displacement of the lever toward the second position by the operator.

Also in accordance with an embodiment of the invention, there is provided a lawn mower wherein the member is generally disc-shaped, wherein the blade includes an end portion having a cutting edge, and wherein the blade bias means affords movement of the blade to the extended position wherein the cutting edge extends outwardly beyond the peripheral edge when the member rotates above the predetermined speed.

Also in accordance with an embodiment of the invention, there is provided a lawn mower wherein the blade is secured to the member to afford rectilinear movement of the blade with respect to the member, and wherein the blade bias means comprises a spring affording the rectilinear movement of the blade.

Also in accordance with an embodiment of the invention, there is provided a lawn mower wherein the blade is pivotally secured to the member, and wherein the blade bias means comprises a spring affording pivotal movement of the blade with respect to the member.

Also in accordance with an embodiment of the invention, there is provided a lawn mower wherein the member includes an interior channel having an opening extending transversely through the peripheral edge, wherein the blade is movably secured within the interior channel, and wherein the blade bias means is adapted so as to resist centrifugal force exerted on the blade, the bias means affording movement of the cutting edge through the opening when the member rotates above the predetermined speed.

Also in accordance with an embodiment of the invention, there is provided a lawn mower wherein the blade bias means comprises a coil spring in engagement with the member and the blade to afford rectilinear movement of the blade within the interior channel, the coil spring being compressed when the blade moves to the extended position.

Also in accordance with an embodiment of the invention, there is provided a lawn mower comprising a blade housing, a generally disc-shaped member adapted for rotation within the blade housing, the member having a radially disposed peripheral edge and also having a pair of interior channels each having an oppositely directed opening extending transversely through the peripheral edge, a pair of blades each having an end portion including a cutting edge, the blades being respectively movably secured within the interior channels for movement between a retracted position wherein the blades are positioned inwardly of the peripheral edge, and an extended position wherein the cutting edges of the blades extend outwardly through the channel openings beyond the peripheral edge, and means for biasing the blades so as to resist centrifugal force exerted on the blades, the bias means biasing the blades to the retracted position in the absence of rotation of the member above a predetermined speed, the bias means affording movement of the blades to the extended position when the member rotates above the predetermined speed.

One of the principal features of the invention is the provision of a lawn mower comprising a blade mounting which includes a member having a peripheral edge, one or more blades movably secured to the member for movement between a retracted position wherein the blades are positioned inwardly of the peripheral edge, and an extended position wherein the blades extend outwardly beyond the peripheral edge, and means for resisting centrifugal force acting on the blades and for biasing the blades to the retracted position in the absence of rotation of the member above a predetermined speed.

Another of the principal features of the invention is the provision of a lawn mower including a handle having an operating lever adapted for displacement by an operator, and control means coupled to the lever which, in the absence of displacement of the lever by an operator, automatically reduces the speed of rotation of the member to a speed not greater than the predetermined speed so that the blades remain in the retracted position.

Another of the principal features of the invention is the provision of the blade mounting comprising a disc-shaped member including one or more interior channels having openings extending transversely through the member peripheral edge, wherein the blades are movably secured for rectilinear movement within the interior channels and include an end portion having a cutting edge, and wherein the blades are biased by coil springs which are compressed to afford movement of the cutting edges outwardly through the openings when the member rotates above the predetermined speed.

Other features and advantages of the embodiments of the invention will become known by reference to the following general description, claims, and drawings.

THE DRAWINGS

FIG. 1 is a perspective view of a lawn mower embodying various of the features of the invention.

FIG. 2 is a perspective view of a blade mounting incorporated in the lawn mower shown in FIG. 1.

FIG. 3 is a view similar to FIG. 2 wherein the blades of the blade mounting are shown in an extended position.

FIG. 4 is an exploded perspective view of the blade mounting shown in FIG. 2.

FIG. 5 is a partially broken away top view of a blade mounting illustrating another embodiment of the invention.

FIG. 6 is a partial side view of a throttle linkage mechanism incorporated in the lawn mower shown in FIG. 1.

FIG. 7 is a side sectional view of a clutch and brake mechanism which can be incorporated in the lawn mower shown in FIG. 1, and which illustrates another embodiment of the invention.

FIG. 8 is a plan view of the clutch and brake mechanism taken along the line 8—8 in FIG. 7.

FIG. 9 is a side view of the clutch and brake mechanism taken along the line 9—9 in FIG. 8.

Before explaining the embodiments of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in the drawings is a lawn mower 11 including a blade housing 13 supporting a prime mover, such as an electric motor or internal combustion engine, which prime mover drives a cutting blade assembly or blade mounting 17. The prime mover preferably comprises an internal combustion engine 15 which rotates an output or drive member or drive shaft 25 which is connected to the blade mounting 17 as described below. The blade housing 13 can be suitably supported for travel over the ground in any manner, and can be guided for travel over the ground by a suitable handle 23 or other steering mechanisms.

The handle 23 preferably includes an operating lever 24 which is coupled by a cable or linkage 85 to control means such as a throttle linkage mechanism 21 (see FIG. 6) or such as a combined clutch and brake mechanism 119 (see FIG. 9). As will be described in more detail below, the control means automatically regulates the speed of rotation of the blade mounting 17 in the absence of displacement of the lever 24 by an operator.

The blade mounting 17 comprises a member 18 having a peripheral edge 36 and being adapted for rotation within the blade housing 13. The member 18 can comprise various arrangements and shapes, and, as shown in the illustrated construction, is preferably a planar, disc-shaped member made up from a pair of circular plates 19 which are secured together with bolts 22. The member 18 can be secured in any suitable manner to the drive shaft 25. In the illustrated construction shown in FIG. 4, the drive shaft 25 includes a tapered threaded end portion 30 which extends through a tapered central aperture 32 in the member 18 and which engages a threaded nut 34.

The blade mounting 17 includes one or more blades 45 movably secured to the member 18 for movement between a retracted position (see FIG. 2) wherein the blades are positioned inwardly of the peripheral edge 36 and an extended position (see FIG. 3) wherein the blades extend outwardly beyond the peripheral edge 36. Each of the blades 45 preferably includes an end portion having a cutting edge 49 which effects a cutting action on grass or other material when the blades are rotating and have moved to the extended position. As will be explained in more detail below, the blade mounting 17 includes means for biasing the blade members 45 to the retracted position wherein the cutting edges 49 are positioned inwardly of the peripheral edge 36 in the absence of rotation of the member 18 above a predetermined speed.

While various arrangements are possible, the generally disc-shaped member 18 perferably includes one or more interior channels 47 which receive the blades 45. The channels 47 are defined by rectangular lips 46 formed within the circular plates 19. Each channel 47 includes an opening 48 extending transversely through the peripheral edge 36 of the member 18. As shown in the illustrated construction in FIGS. 2-4, the disc-shaped member 18 preferably includes a pair of interior channels 47 having oppositely directed openings 48 which extend through the peripheral edge 36. The blades 45 are preferably movably secured within the channels 47 by the blade bias means to afford rectilinear movement of the cutting edges 49 outwardly through and beyond the channel openings 48 when the member 18 rotates above the predetermined speed.

While various means for biasing the blades 45 are possible, such means preferably comprises compressible helical or coil springs 50, each adapted for engagement with the member 18 and one of the blades 45. More specifically, each coil spring 50 is retained on a pilot pin 20 (partially shown) in a rectangular slot 42 cut out of an end portion of the blade 45 opposite the end portion including the cutting edge 49. The springs 50 are held within elongated semi-circular grooves 58 formed within the interior channels 47 of the circular plates 19.

Each of the semi-circular grooves 58 includes an end lip 53 which abuts against the free end of one of the coil springs 50. As the member 18 rotates, the coil springs 50 are compressed against the end lips 53 by the centrifugal force acting on the blades 45. As the speed of rotation and such centrifugal force increases, the blades 45 further compress the springs 50 and move outwardly to the extended position beyond the peripheral edge 36. As will be described in more detail below, the coil springs 50 are selected to resist compression, or to bias the blades 45 to the retracted position within the peripheral edge 36, in the absence of rotation of the member 18 above a predetermined speed. The outward movement of the blades 45 to the extended position is automatically limited when the coil springs 50 have become fully compressed against the end lips 53.

If the blades 45 encounter substantial resistance from cutting through a heavy load or striking objects such that the speed of the blade mounting 17 is reduced, the blades 45 will move inwardly toward the retracted position so that the resistance on the blades is reduced until the speed of the blade mounting 17 is no longer decreasing. If the blades 45 encounter resistance great enough to slow the blade mounting 17 to a speed not greater than the predetermined speed, the blades 45 will move to the fully retracted position, thereby preventing the excessive resistance from stalling the engine 15. After the obstruction creating the resistance has been passed over, the speed of rotation of the blade mounting 17 will increase so that the blades return to the cutting or extended position.

As noted above, the bias means or coil springs 50 bias the blades 45 to the retracted position in the absence of rotation of the member 18 above a predetermined speed. While any predetermined speed could be selected, the predetermined speed is preferably equal to the speed of rotation of the member 18 during idle engine operation. For purposes of example only, if the predetermined speed of rotation of the member 18 is 1200 rpm, then the engine 15 would run at an idle speed of 1200 rpm with the member 18 secured to the drive shaft 25 for coincident rotation therewith.

For the example given, the bias means or coil springs 50 are chosen to resist the centrifugal force exerted on the blades 45 and to bias or maintain the blades 45 in the retracted position in the absence of rotation of the member 18 above 1200 rpm. When a cutting action is desired, the engine speed is increased above idle speed so that the member 18 rotates at a speed greater than the predetermined or idle speed of 1200 rpm. The resultant increased centrifugal force exerted on the blades 45 compresses the coil springs 50, the springs thereby affording rectilinear movement of the blades 45 to the cutting or extended position wherein the cutting edges 49 extend outwardly beyond the peripheral edge 36.

Thus, a blade mounting 17 is provided wherein the blades 45 are biased to a retracted position when the speed of the engine is not greater than the predetermined or idle speed, e.g., 1200 rpm. When the speed of the engine is increased above the predetermined or idle speed for cutting operation, the blades 45 move to the cutting or extended position.

Shown in FIG. 5 is another embodiment of a blade mounting 117 which is similar to that shown in FIGS. 2-4 and which can be similarly incorporated in the lawn mower 11 shown in FIG. 1. The components of the blade mounting 117 shown in FIG. 5 which are similar to the components of the blade mounting 17 shown in FIGS. 2-4 are designated by the same reference numerals.

The blade mounting 117 includes one or more blades 45 (four shown) which are pivotally secured to a disc-shaped member 18 by pivot pins 44. The blades 45 are pivotally secured to the member 18 for movement between a retracted position wherin the blades are positioned inwardly of the peripheral edge 36 and a cutting or extended position wherein the blades 45 extend outwardly beyond the peripheral edge 36 of the member 18. Pins or stops 56 are secured to the member 18 adjacent the peripheral edge 36 to limit the outward pivotal movement of the blades 45 when they move to the extended position.

As shown in the embodiment illustrated in FIG. 5, the bias means comprises extendable springs 52 (one shown) secured to interior portions of the member 18 and to intermediate portions of the blades 45. The movement of the springs 52 is different from the movement of the previously described coil springs 50 in that sufficient centrifugal force exerted on the blades 45 causes the springs 52 to extend (rather than to be compressed), the springs 52 thereby affording outward pivotal movement of the blades 45 to the extended position.

Since the selection of the bias means or springs 52 and the operation of the blade mounting 117 is similar to that described for the blade mounting 17, a detailed description will not be repeated. Briefly, the blades 45 are biased by the springs 52 to a retracted position within the peripheral edge 36 when the speed of the engine 15 is not greater than a predetermined or idle speed. When the speed of the engine is increased above the predetermined or idle speed for cutting operation, the resultant increased centrifugal force exerted on the blades 45 causes the springs 52 to extend, the springs thereby affording outward pivotal movement of the blades 45 to the cutting or extended position. As noted above, the stops 56 limit the outward pivotal movement of the blades 45 when they move to the extended position.

The lawn mower 11 preferably includes means for assuring that the blades 45 remain in the retracted position in the absence of attendance by an operator. To this end, as noted above, an operating lever 24 is movably mounted on the lawn mower handle 23 for displacement by an operator. More specifically, the lever 24 is preferably mounted on the handle for displacement by the operator between a first position spaced from the handle, and a second position adjacent the handle (see FIG. 1 solid and phantom lines). Control means (described below) are coupled to the lever 24 and include bias means for urging or biasing the lever 24 to the first position. In the absence of displacement by the operator of the lever 24 toward the second position, the control means automatically reduces the speed of rotation of the member 18 to a speed not greater than the predetermined speed so that the blades 45 are biased to the retracted position While various control means arrangements are possible, as shown in the illustrated construction in FIGS. 1 and 6, the control means preferably comprises a throttle linkage mechanism 21. The throttle linkage mechanism 21 cooperates with the carburetion system of the lawn mower 11 (described below) to increase or decrease the speed of the engine 15, and hence to regulate the speed of rotation of the drive shaft 25 and the blade mounting 17.

As shown in FIG. 6, the lawn mower 11 includes a carburetion system having an intake passage 59 including a rotatable plate 57 which controls the amount of air or air-fuel mixture flowing through the intake passage 59 to the engine (not shown). The plate 57 is mounted on a pivot pin 67 which is suitably rotatably mounted or journaled through the sidewalls of the intake passage 59 (not shown).

The control means or throttle linkage mechanism 21 includes a link 65 which is pivotally mounted adjacent the intake passage 59 by having a lower end 68 fixedly secured to the rotatable pivot pin 67. Pivotal displacement of the link 65 results in rotation of the pivot pin 67 and plate 57 within the intake passage 59. The upper end of the link 65 is secured to a cable or linkage 85 by a pin 66, which linkage 85 is coupled to the operating lever 24 movably mounted on the lawn mower handle 23. Displacement of the operating lever 24 by an operator results in pivotal displacement of the link 65, and thus, the lever 24 provides an operator with control over rotation of the plate 57 within the intake passage 59, and hence, with control over the speed of the engine 15.

The control means or throttle linkage mechanism 21 includes bias means for automatically biasing or pivotally displacing the link 65, and hence the plate 57, to an idle position, i.e. to a position wherein the plate 57 limits the amount of air or air-fuel mixture flowing through the intake passage 59 so that the engine 15 runs at a speed not greater than the predetermined or idle speed.

In the illustrated construction, the bias means comprises a spring 91 located about the pivotal mounting of the link 65 on the blade housing 13 so as to bias the link 65 in a counterclockwise direction to the idle position. When the link 65 is biased to this idle position, the bias means or spring 91 which is coupled to the lever 24 through the link 65 and linkage 85 also biases the operating lever 24 to the first position (described above) spaced from the handle 23. Thus, in the absence of displacement by an operator of the lever 24 away from the first position and toward the second position, the bias means or spring 91 automatically reduces the speed of the engine 15, and hence the speed of the disc-shaped member 18, to a speed not greater than the predetermined or idle speed so that, as described above, the blades 45 move to the retracted position.

When it is desired to run the lawn mower at an engine speed greater than the predetermined or idle speed for effecting a cutting operation, the operating lever 24 is pivoted toward the second position adjacent the handle 23 so that the bias means or spring 91 is overcome. More specifically, as the operating lever 24 is pivoted toward the second position, the cable or linkage 85 causes the link 65 and plate 57 to rotate in a clockwise direction, the plate 57 increasing the amount of air or air-fuel mixture flowing through the intake passage 59 so that the speed of the engine 15 increases above the predetermined or idle speed. Thus, when the operating lever 24 is displaced by an operator toward the second position adjacent the handle 23, the speed of rotation of the disc-shaped member 18 increases above the predetermined or idle speed so that the blades 45 move to the extended cutting position wherein the cutting edges 49 extend outwardly beyond the peripheral edge 36.

It should be readily understood that in the absence of displacement of the lever 24 toward the second position by an operator, the bias means or spring 91 automatically biases or returns the lever 24 to the first position, and at the same time, automatically biases or pivotally displaces the link 65 and plate 57 counterclockwise to the idle position. Hence, in the absence of displacement of the lever 24, the speed of the engine is reduced to a speed not greater than the predetermined or idle speed so that the blades 45 are biased inwardly to the retracted position.

Shown in FIGS. 7-9 is another embodiment of control means which can be incorporated in the lawn mower 11 shown in FIG. 1, and which, in the absence of displacement of the lever 24 by an operator, automatically brakes or reduces the speed of rotation of the blade mounting 17 so that the blades 45 are biased to their retracted position. The control means comprises a clutch and brake mechanism 119 having a hub member 33 (described below) to which is secured the cutting blade assembly or blade mounting 17 (diagrammatically shown). The components of the clutch and brake mechanism 119 which are similar to the components of the throttle linkage mechanism 21 are designated by the same reference numerals.

As shown in the illustrated construction, the clutch and brake mechanism 119 preferably comprises a hub member 33 which includes an upper, centrally apertured and downwardly open cup member 134 and a lower, upwardly open cup member 136 suitably secured together to form a chamber 138, which chamber contains interleaved discs 41 and 43 (described below). The hub member 33 is preferably supported for rotation on the lawn mower drive shaft 25 (modified to include a lower portion having an axial bore 170) by upper and lower bearings respectively engaged between the drive shaft 25 and the upper cup member 134 and the lower cup member 136 (only the lower bearing 142 being shown). The bearings provide for vertical movement of the hub member 33 on the drive shaft 25 as well as rotary movement therebetween. In addition, a seal 140 is formed between the drive shaft 25 and the apertured upper cup member 134 to thereby seal the chamber 138. The blade mounting 17 is secured to the hub member 33 by being suitably secured to a lower portion of the upwardly open cup member 136.

Clutch means are provided between the drive shaft 25 and the hub member 33. In the illustrated construction, a series of friction leaves or discs 41 are keyed or splined to the drive shaft 25 for common rotation with the drive shaft 25 while also permitting movement of the leaves or discs 41 axially of the drive shaft 25. Interleaved between the discs or leaves 41 is another series of discs or leaves 43 which are keyed or splined into the inner surface of the downwardly open cup member 134 for rotation in common with the hub member 33 and for movement axially of the drive shaft 25. Thus, when the two series of discs 41 and 43 are pressed together in driving engagement, rotary power is transmitted from the drive shaft 25 to the hub member 33 and to the blade mounting 17 secured thereto. When the leaves or discs 41 and 43 are not pressed together, the output shaft 25 and the hub member 33 are rotatably relative to each other.

Contained within the chamber 138 is a quantity of oil which serves to lubricate the interleaved discs 41 and 43 as well as the thrust bearing 55 (described below) and the lower bearing 142, thereby reducing the operating noise level.

The hub member 33 is retained on the drive shaft 25 for relative rotation therebetween by retainer ring and washer 51 which is snap-fitted into a groove 150 in the drive shaft 25 and which axially supports a washer type member 152 which, in turn, axially supports the lowermost one of the interleaved discs 41 and 43. In turn, the top wall 160 of the upper cup member 134 rests on the uppermost one of the interleaved discs 41 and 43 so as to axially support the lower cup member 136 and blade mounting 17 secured thereto.

Means are also provided for biasing the discs 41 and 43 into driving engagement with one another. While various arrangements can be employed, in the illustrated construction, such means comprises a helical spring 53 which is located within the axial bore 170 of the drive shaft 25, which, at its upper end, bears against the blind end of the bore 170 and which, at its lower end, bears against a thrust bearing 55 surrounding a pilot pin 172 extending upwardly in an open portion of the lower cup member 136.

The control means or clutch and brake mechanism 119 includes means provided for upwardly displacing the hub member 33 against the action of the spring 53 to permit relative rotation between the two series of discs 41 and 43 and to simultaneously brake the hub member 33 and the blade mounting 17 secured thereto against rotation. While various arrangements can be employed, in the illustrated construction, such means comprises a brake member 61 which is located below a braking surface on the hub member 33 which is constituted by the lower surface of a flange 39 at the top of the lower cup member 136. The brake member 61 is located in encircling relation to the upwardly open lower cup member 136 and includes an upper surface having mounted thereon a brake pad 63 engagable with the braking surface constituted by the lower surface of the upper flange 39.

The control means also includes means provided or mounted on the lawn mower 11 for guiding movement of the brake member 61 in a direction of the axis of drive shaft rotation and for displacing the brake member 61 between a retracted position below the lower surface of the upper flange 39 and a raised braking position engaging the brake pad 63 against the lower surface of the upper flange 39 so as to raise the hub member 33 to disengage the clutch against the action of the spring 53 and simultaneously to stop or brake rotation of the hub member 33 and the blade mounting 17 secured thereto.

Various arrangements can be employed for guiding and displacing the brake member 61. In the illustrated construction, means for displacing the brake member 61 axially of the drive shaft 25 comprises (see FIG. 8) a fork-shaped member or lever 173 having spaced legs 75 which, at their outer ends, are pivoted to the blade housing 13 on a shaft 180 having its ends anchored in spaced blocks 182 fixed to the blade housing 13. The fork legs 75 straddle the hub 33 and are each pivotally connected to the brake member 61 by pins 184 extending from legs 75 and into depending bosses 186 on the undersurface of the brake member 61. Any lateral shifting of the brake member 61 which may result from pivotal movement of the fork member 173 is accommodated by clearance between the peripheral margin of the central aperture in the brake member 61 and the outer periphery of the lower cup member 136.

The fork member 173 is pivotally connected, at its other end, as shown in FIGS. 8 and 9, with one end of a link 190 which passes through an aperture 191 in a top deck 192 of the blade housing 13 and which, at its other end, is pivotally connected to one leg 193 of a bell crank lever 194 pivotally mounted on the upper surface of the top deck 192 of blade housing 13. In turn, the other leg 195 of the bell crank lever 194 is pivotally connected to one end of the linkage 85 which extends to the operating lever 24 of the lawn mower 11.

Bias means are employed to bias the overall linkage so as to normally locate the brake member 61 in its raised braking position, thereby braking the hub member 33 and blade mounting 17 against rotation and effecting disengagement of the clutch. In the illustrated construction, the bias means comprises a spring 91 located about the pivotal mounting of the bell crank lever 194 on the blade housing 13 so as to bias the bell crank lever 194 in a counterclockwise direction as shown in FIG. 9, thereby raising the brake member 61 to its raised braking position. When the bell crank lever 94 is biased to this braking position, the bias means or spring 91 which is coupled to the lever 24 through the bell crank lever 194 and linkage 85 simultaneously biases the operating lever 24 to a first position (as described earlier) spaced from the handle 23.

When the operating lever 24 is displaced toward a second position adjacent the handle 23, the linkage 85 connects the operating lever 24 and the bell crank lever 194 so that the lever 173 is moved to a position locating the brake member 61 in a lowered position allowing driving engagement of the hub member 33 and blade mounting 17. More specifically, when the lever 24 is displaced toward the second position, the linkage 85 overcomes the bias means or spring 91 so that the brake member 61 is held in the lowered position, thereby permitting clutch engagement by the helical spring 53 and transmission of rotary power to the hub member 33 and blade mounting 17 secured thereto.

It is to be understood that starting of the engine 15 without displacing the operating lever 24 toward the second position adjacent the handle 23 will not effect rotation of the hub member 33 and the blade mounting 17, and hence the blades 45 will remain in the retracted position. When it is desired to run the lawn mower 11 at an engine speed greater than the predetermined or idle speed for effecting a cutting operation, the lever 24 is displaced toward the second position so that the clutch engages and the hub member 33 and blade mounting 17 are driven by the drive shaft 25 to a speed of rotation greater than the predetermined or idle speed so that the blades 45 will move to the cutting or extended position.

In the absence of an operator urging the lever 24 toward the second position, the bias means or spring 91 automatically biases or returns the lever 24 to the first position, and simultaneously biases or pivotally displaces the bell crank lever 94 counterclockwise, thereby raising the brake member 61 to its raised braking position. Hence, in the absence of displacement of the lever 24, the brake member 61 effects disengagement of the clutch and brakes the hub member 33 and blade mounting 17 against rotation. During this braking operation, the blades 45 will be biased inwardly to the retracted position when the speed of rotation of the hub member 33 and the blade mounting 17 has been reduced to a speed not greater than the predetermined or idle engine speed. After such a braking operation, the blades 45 will not return to the cutting or extended position until after the clutch has been re-engaged and the blade mounting 17 is driven by the drive shaft to a speed of rotation greater than the predetermined or idle speed.

Various of the features of the invention are set forth in the following claims.

What is claimed is:

1. A lawn mower comprising a blade housing, a member adapted for rotation within said blade housing and having a peripheral edge, a blade movably secured to said member for movement between a retracted position wherein said blade is positioned inwardly of said peripheral edge, and an extended position wherein said blade extends outwardly beyond said peripheral edge, and means for biasing said blade to said retracted position in the absence of rotation of said member above a predetermined speed.

2. A lawn mower in accordance with claim 1 and further including a handle having an operating lever adapted for displacement by an operator, and control means coupled to said lever for automatically reducing the speed of rotation of said member to a speed not greater than the predetermined speed in the absence of displacement of said lever by the operator.

3. A lawn mower in accordance with claim 2 wherein said lever is movably mounted on said handle for displacement between a first position spaced from said handle and a second position adjacent said handle, and wherein said control means inlucdes means for biasing said lever to said first position, said control means automatically reducing the speed of rotation of said member to a speed not greater than the predetermined speed in the absence of displacement of said lever toward said second position by the operator.

4. A lawn mower in accordance with claim 1 wherein said member is generally disc-shaped, wherein said blade includes an end portion having a cutting edge, and wherein said blade bias means affords movement of said blade to said extended position wherein said cutting edge extends outwardly beyond said peripheral edge when said member rotates above the predetermined speed.

5. A lawn mower in accordance with claim 4 wherein said blade is secured to said member to afford rectilinear movement of said blade with respect to said member, and wherein said bias means comprises a spring affording said rectilinear movement of said blade.

6. A lawn mower in accordance with claim 4 wherein said blade is pivotally secured to said member, and wherein said bias means comprises a spring affording pivotal movement of said blade with respect to said member.

7. A lawn mower in accordance with claim 4 wherein said member includes an interior channel having an opening extending transversely through said peripheral edge, wherein said blade is movably secured within said interior channel, and wherein said bias means is adapted so as to resist centrifugal force exerted on said blade, said bias means affording movement of said cutting edge through said opening when said member rotates above the predetermined speed.

8. A lawn mower in accordance with claim 7 and further including a handle having an operating lever movably mounted on said handle for displacement by an operator between a first position spaced from said handle and a second position adjacent said handle, and control means including bias means for biasing said lever to said first position, said control means automatically reducing the speed of rotation of said member to a speed not greater than the predetermined speed in the absence of displacement of said lever toward said second position by the operator.

9. A lawn mower in accordance with claim 7 wherein said blade is secured to said member to afford rectilinear movement of said blade within said interior channel, and wherein said bias means comprises a spring located within said interior channel.

10. A lawn mower in accordance with claim 9 wherein said spring comprises a coil spring in engagement with said member and said blade, said coil spring being compressed when said blade moves to said extended position.

11. A lawn mower comprising a blade housing, a generally disc-shaped member adapted for rotation within said blade housing, said member having a peripheral edge and also having a pair of interior channels each having an oppositely directed opening extending transversely through said peripheral edge, a pair of blades each having an end portion including a cutter edge, said blades being respectively movably secured within said interior channels for movement between a retracted position wherein said blades are positioned inwardly of said peripheral edge, and an extended position wherein said cutting edges of said blades extend outwardly through said channel openings beyond said peripheral edge, and means for biasing said blades so as to resist centrifugal force exerted on said blades, said bias means biasing said blades to said retracted position in the absence of rotation of said member above a predetermined speed, said bias means affording movement of said blades to said extended position when said member rotates above the predetermined speed.

12. A lawn mower in accordance with claim 11 and further including a handle having an operating lever movably mounted on said handle for displacement by an operator between a first position spaced from said handle and a second position adjacent said handle, and control means including bias means for biasing said lever to said first position, said control means automatically reducing the speed of rotation of said member to a speed not greater than the predetermined speed in the absence of displacement of said lever toward said second position by the operator.

13. A lawn mower in accordance with claim 11 wherein said blades are secured to said member to afford rectilinear movement of said blades within said interior channels, and wherein said blade bias means comprises a spring located within each of said interior channels.

14. A lawn mower in accordance with claim 13 wherein each of said springs comprises a coil spring, said coil springs being compressed when said blades move to said extended position.

15. A blade mounting adapted for use with a lawn mower having a blade housing, said mounting comprising a member adapted for rotation within the blade housing and having a peripheral edge, a blade movably secured to said member for movement between a retracted position wherein said blade is positioned inwardly of said peripheral edge, and an extended position wherein said blade extends outwardly beyond said peripheral edge, and means for biasing said blade to said retracted position in the absence of rotation of said member above a predetermined speed.

16. A blade mounting in accordance with claim 15 wherein said member is generally disc-shaped, wherein said blade includes an end portion having a cutting edge, and wherein said blade bias means affords movement of said blade to said extended position wherein said cutting edge extends outwardly beyond said peripheral edge when said member rotates above the predetermined speed.

17. A blade mounting in accordance with claim 16 wherein said blade is secured to said member to afford rectilinear movement of said blade with respect to said member, and wherein said bias means comprises a spring affording said rectilinear movement of said blade.

18. A blade mounting in accordance with claim 16 wherein said blade is pivotally secured to said member, and wherein said bias means comprises a spring affording pivotal movement of said blade with respect to said member.

19. A blade mounting in accordance with claim 16 wherein said member includes an interior channel having an opening extending transversely through said peripheral edge, wherein said blade is movably secured within said interior channel, and wherein said bias means is adapted so as to resist centrifugal force exerted on said blade, said bias means affording movement of said cutting edge through said opening when said member rotates above the predetermined speed.

20. A blade mounting in accordance with claim 19 wherein said blade is secured to said member to afford rectilinear movement of said blade within said interior channel, and wherein said bias means comprises a spring located within said interior channel.

21. A blade mounting in accordance with claim 20 wherein said spring comprises a coil spring in engagement with said member and said blade, said coil spring being compressed when said blade moves to said extended position.

22. A blade mounting adapted for use with a lawn mower having a blade housing, said mounting comprising a generally disc-shaped member adapted for rotation within the blade housing, said member having a peripheral edge, and also having a pair of interior channels each having an oppositely directed opening extending transversely through said peripheral edge, a pair of blades each having an end portion including a cutting edge, said blades being respectively movably secured within said interior channels for movement between a retracted position wherein said blades are positioned inwardly of said peripheral edge, and an extended position wherein said cutting edges of said blades extend outwardly through said channel openings beyond said peripheral edge, and means for biasing said blades so as to resist centrifugal force exerted on said blades, said bias means biasing said blades to said retracted position in the absence of rotation of said member above a predetermined speed, said bias means affording movement of said blades to said extended position when said member rotates above the predetermined speed.

23. A blade mounting in accordance with claim 22 wherein said blades are secured to said member to afford rectilinear movement of said blades within said interior channels, and wherein said bias means comprises a spring located within each of said interior channels.

24. A blade mounting in accordance with claim 23 wherein each of said springs comprises a coil spring, said coil springs being compressed when said blades move to said extended position.

* * * * *